United States Patent
Turner et al.

(10) Patent No.: US 7,251,759 B2
(45) Date of Patent: Jul. 31, 2007

(54) METHOD AND APPARATUS TO COMPARE POINTERS ASSOCIATED WITH ASYNCHRONOUS CLOCK DOMAINS

(75) Inventors: Tony Turner, Foothill Ranch, CA (US); John Lupienski, Phoenix, AZ (US)

(73) Assignee: Broadcom Corporation, Irvine, CA (US)

( * ) Notice: Subject to any disclaimer, the term of this patent is extended or adjusted under 35 U.S.C. 154(b) by 252 days.

(21) Appl. No.: 10/918,408

(22) Filed: Aug. 16, 2004

(65) Prior Publication Data

US 2006/0036918 A1 Feb. 16, 2006

(51) Int. Cl.
*G11C 29/18* (2006.01)
*G11C 29/14* (2006.01)
(52) U.S. Cl. .................. 714/719; 714/718
(58) Field of Classification Search .......... 714/719, 714/718, 25, 48, 715, 3
See application file for complete search history.

(56) References Cited

U.S. PATENT DOCUMENTS

| | | | | |
|---|---|---|---|---|
| 4,959,836 A | * | 9/1990 | Berard et al. ............. 714/822 |
| 6,161,160 A | * | 12/2000 | Niu et al. ................. 710/310 |
| 6,173,386 B1 | * | 1/2001 | Key et al. ................. 712/10 |
| 6,225,933 B1 | * | 5/2001 | Salter et al. .............. 341/144 |
| 6,243,728 B1 | * | 6/2001 | Farooqui et al. .......... 708/209 |
| 6,987,953 B2 | * | 1/2006 | Morris et al. ............. 455/102 |
| 2002/0194401 A1 | * | 12/2002 | Sakugawa ................. 710/28 |

* cited by examiner

*Primary Examiner*—Guy Lamarre
*Assistant Examiner*—Dipakkumar Gandhi
(74) *Attorney, Agent, or Firm*—Sterne, Kessler, Goldstein & Fox PLLC (57) ABSTRACT

A multi-bit write pointer that is associated with a first clock can be converted to a single-bit write pointer. A multi-bit read pointer that is associated with a second clock can be converted to a single-bit read pointer. The first clock and the second clock are not synchronized. One or more guard bits can be associated with the single-bit write pointer and/or the single-bit read pointer. The single-bit write pointer and the single-bit read pointer can be compared. According to an embodiment, an error can be detected in response to comparing the single-bit write pointer and the single-bit read pointer.

25 Claims, 4 Drawing Sheets

METHOD AND APPARATUS TO COMPARE POINTERS ASSOCIATED WITH ASYNCHRONOUS CLOCK DOMAINS

BACKGROUND OF THE INVENTION

1. Field of the Invention

The present invention generally relates to asynchronous clock technology, and more specifically to pointers associated with asynchronous clock domains.

2. Background

An electronic device generally performs operations based on a clock. The clock is often generated internally by the device, though the clock can be based on an external clock, such as a clock of another device. Clocks of different devices can be synchronized or unsynchronized. Unsynchronized clocks are known as "asynchronous clocks". Asynchronous clocks need not operate at different frequencies. For instance, the phase of one clock can differ from the phase of another clock having the same frequency.

Information is often temporarily stored in a memory, such as a register, when being transferred between devices having asynchronous clocks. A first device can write the information to the register, and a second device can read the information from the register. The first device uses a write pointer to specify the address of the register at which the information is to be written. The second device uses a read pointer to specify the address of the register at which the information is to be read. The addresses of the register are typically multi-bit addresses.

The address of the write pointer and the address of the read pointer are often compared to determine whether the read pointer is properly aligned to read the information written by the first device. Comparing the multiple-bit pointers typically requires multiple clock cycles. However, at high frequencies, the addresses of the pointers can change at every clock cycle. The pointers can become unstable because the addresses of the pointers cannot be accurately determined.

What is needed is a method and apparatus to compare pointers associated with asynchronous clock domains.

BRIEF SUMMARY OF THE INVENTION

The present invention provides a method and apparatus to compare pointers associated with asynchronous clock domains. A multi-bit write pointer is associated with a first clock. A multi-bit read pointer is associated with a second clock that is not synchronized with the first clock. A first bit can represent the multi-bit write pointer. A second bit can represent the multi-bit read pointer. A first plurality of bits can include the first bit. A second plurality of bits can include the second bit. The first plurality of bits and/or the second plurality of bits can include one or more guard bits. The first plurality of bits and the second plurality of bits can be compared. According to an embodiment, an error can be detected in response to comparing the first plurality of bits and the second plurality of bits.

BRIEF DESCRIPTION OF THE DRAWINGS/FIGURES

The present invention is described with reference to the accompanying drawings. In the drawings, like reference numbers indicate identical or functionally similar elements. Additionally, the left most digit(s) of a reference number identifies the drawing in which the reference number first appears.

DETAILED DESCRIPTION OF THE INVENTION

Figure 1:
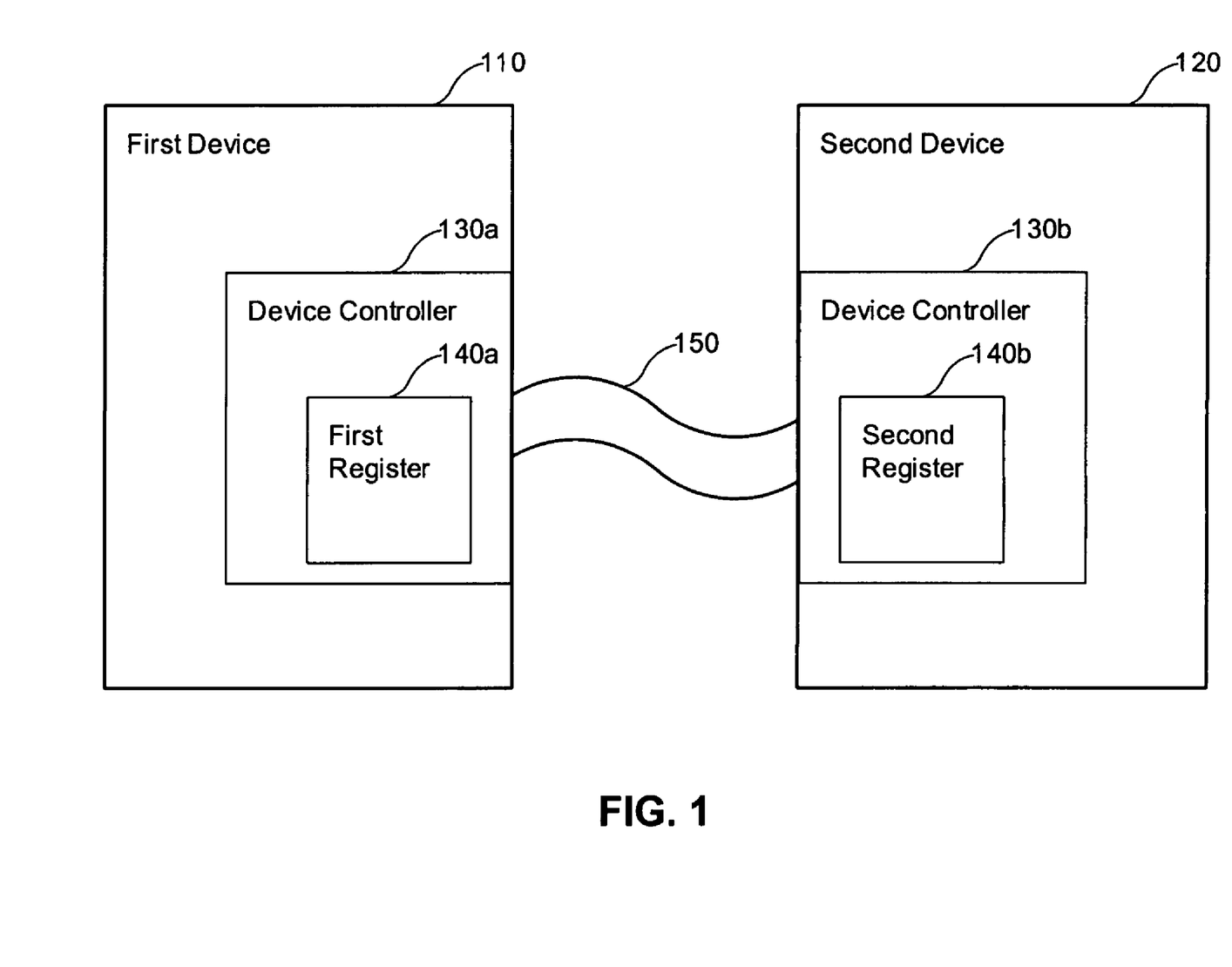
FIG. 1 illustrates a system having asynchronous clocks according to an embodiment of the present invention.

FIG. 1 illustrates a system having asynchronous clocks according to an embodiment of the present invention. A first device 110 has a first clock. A second device 120 has a second clock that is not synchronized with the first clock. The first device 110 or the second device 120 can be a video camera, a personal video recorder, a settop box, a server, a barcode reader or scanner, a Moving Pictures Experts Group Audio Layer 3 (MP3) player or storage device, or a computer, to provide some examples.

The first and second clocks can have substantially the same frequency, though the scope of the invention is not limited in this respect. For example, the first and second clocks can each have a frequency of 480 MHz±500 ppm, or 480 MHz±240 kHz. The first clock can have a first frequency in the range of 479.76 MHz and 480.24 MHz, and the second clock can have a second frequency in the range of 479.76 MHz and 480.24 MHz. In this example, the first and second clocks are within 480 kHz of each other.

In a first example, the first device 110 includes a device controller 130a to which the first device 110 writes information. For example, the device controller 130a generally includes a first register 140a to temporarily store the information written by the first device 110, so that the information can be read by another device, such as the second device 120. The second device 120 can read the information from the first register 140a.

In a second example, the second device 120 includes a host controller 130b to which the second device 120 writes information. The host controller 130b typically includes a second register 140b to temporarily store the information written by the second device 120, so that the information can be read by the first device 110. The first device 110 can read the information from the second register 140b.

In a third example, the second device 120 writes information to the first register 140a of the first device 110. The first register 140a can temporarily store the information written by the second device 120, so that the first device 110 can read the information.

In a fourth example, the first device 110 writes information to the second register 140b of the second device 120. The second device 120 can read the information from the second register 140b.

The first device 110 and the second device 120 generally communicate via a path 150, such as a serial bus or a wireless link. The first and second devices 110 and 120 can communicate in accordance with a universal serial bus (USB) 2.0 standard or an Institute of Electrical and Electronics Engineers (IEEE) 1394 standard, to provide some examples.

Information can be transmitted via path 150 using packets. A packet often includes multiple (e.g., eight, sixty-four, 1024) bits of information. A controller 130 can determine whether the second device 120 successfully reads a packet written by the first device 110. If the controller 130 determines that an error occurs with respect to the reading operation performed by the second device 120, the controller 130 can set an error flag of the packet. Generally, an error flag having a value of "1" indicates that the error flag is set. The error flag can be a sideband signal of the packet. According to an embodiment, the error flag is defined by the USB 2.0 Transceiver Macrocell Interface (UTMI) specification, which is incorporated herein by reference. The controller 130 can disregard the packet in response to detecting that the error flag is set. If the controller disregards the packet, the controller 130 can request the packet again.

According to the fourth embodiment described above, the host controller 130b can receive the information written by the first device 110 as a serial stream of bits via path 150 at a frequency of approximately 480 MHz. For example, the second device 120 can read one bit of the serial stream of bits per read operation at a frequency of approximately 480 MHz. In another example, the second device 120 can read multiple bits (e.g., eight bits) of the information per read operation at a frequency that is inversely proportional to the number of bits read per read operation. For instance, if the clock associated with the second device 120 operates at a frequency of 480 MHz, the second device 120 can read eight bits of the stream of bits per read operation at a frequency of approximately 60 MHz (e.g., 480 MHz/8=60 MHz). The host controller 130b can be used as a serial-to-parallel converter.

The second device 120 can process the information written by the first device 110. For instance, the host controller 130b of the second device 120 often processes the information. The host controller 130b can perform non-return-to-zero inverted (NRZI) coding/decoding with respect to the bits. The host controller 130b can remove one or more stuff bits from the stream of bits.

Figure 2:
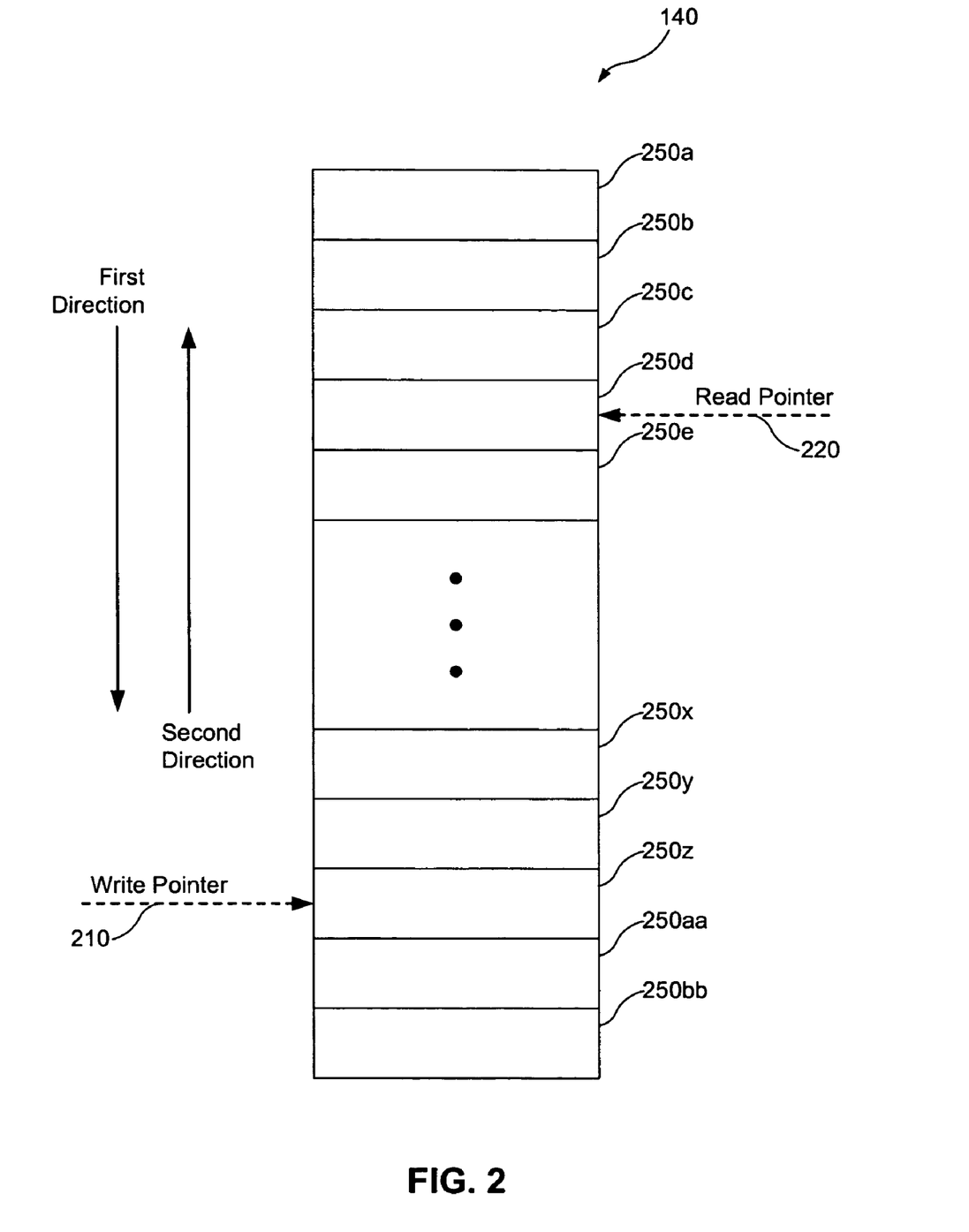
FIG. 2 illustrates a register having a plurality of memory locations according to an embodiment of the present invention.

FIG. 2 illustrates a register 140 having a plurality of memory locations 250 according to an embodiment of the present invention. Each memory location 250 has an address that can be used by the first device 110 to write information to the memory location 250 and by the second device 120 to read the information from the memory location 250. For example, the first device 110 can write information to the register 140 using a write pointer 210. The second device 120 can read the information from the register 140 using a read pointer 220. The write pointer 210 is associated with a write address, which is the address of the register 140 to which the write pointer 210 writes information during a particular clock cycle of the first device 110 in this example. The read pointer 220 is associated with a read address, which is the address of the register 140 from which the read pointer 220 reads during a corresponding clock cycle of the second device 120 according to this example.

The write pointer 210 generally begins writing to the register 140 at a memory location 250 other than the first memory location 250a of the register 140 to reduce the likelihood of the read pointer 220 reading from a memory location 250 before the write pointer 210 finishes writing to the memory location 250. For instance, the write pointer 210 can begin writing at memory location 250n to facilitate an accurate reading by the read pointer 220. The write pointer 210 typically writes to the next consecutive memory location 250 at the next clock cycle of the first device 110.

According to an embodiment, the write pointer 210 writes in a first direction. For instance, the write pointer 210 can write to memory location 250b at the next clock cycle after writing to memory location 250a. The write pointer 210 can write to memory location 250c at the next clock cycle after writing to memory location 250b, and so on. When the write pointer 210 reaches the end of the register 140, memory location 250bb in this example, the write pointer 210 typically returns to the other end of the register 140 to continue writing. For example, the write pointer 210 can write to memory location 250a at the next clock cycle after writing to memory location 250bb.

An error can occur when the write address and the read address are the same. This common address can be referred to as the "read/write address". For instance, the clock cycle of the first device 110 can be shifted in time with respect to the clock cycle of the second device 120, such that the read pointer 220 reads from the read/write address before the write pointer 210 finishes writing to the read/write address. The information stored at the read/write address can be in a state of transition or can be previously stored information when the read pointer 220 reads from the read/write address. For instance, the second device 120 can receive information that is different from the information provided by the first device 110.

According to an embodiment, the register 140 is a first-in, first-out (FIFO) register. For example, the read pointer 220 can read information from the register 140 in the order that the write pointer 210 writes the information. The write pointer 210 and the read pointer 220 are typically capable of writing and reading, respectively, from both ends of the register 140.

The size of the write pointer 210 or the read pointer 220 is usually based on the size of the register 140. For instance, an N-bit pointer can be used if the register 140 has $2^N$ or fewer memory locations 250. For instance, a 5-bit pointer can be used if the register 140 has no more than thirty-two memory locations 250. A 4-bit pointer can be used if the register 140 has no more than sixteen memory locations 250, and so on.

In the embodiment of FIG. 2, the register 140 has twenty-eight memory locations 250, and the write pointer 210 is a 5-bit write pointer. The write pointer 210 can be generated based on positive clock edges, negative clock edges, or positive and negative clock edges. For instance, the first device 110 can generate the write pointer 210, based on positive and negative edges of the clock of the first device 110, using the following verilog write pointer generation algorithm:

```
always @ (posedge rclk480 or negedge resetb_480 )
  begin
    if (~resetb_480 )
      wr_addr  <= 5'b0_0000;
    else if (winit || (wr_addr == 5'b1_1011))
      wr_addr  <= 5'b0_0000;
    else if (rx_en_d1)
      wr_addr  <= wr_addr + 1;
  end
```

The verilog write pointer generation algorithm shows three exemplary conditions, each of which can be satisfied to change the address of the write pointer 210. With respect to the first condition, "~resetb_480" can represent a reset bit. For example, if the reset bit is set to "1", then the write pointer 210 can be reset by setting the write address to "0". According to an embodiment, resetting the write pointer 210 causes the write pointer 210 to return to the first address of the register 140, regardless of the address of the write pointer 210 at the time the reset instruction is performed.

With respect to the second condition, if the write address reaches a value of twenty-seven, the address can be set to zero. For instance, after reaching the last address of the register 140, the write pointer 210 can continue writing at the first address of the register 140.

bits of a bit-field, except for the bit that represents the address of the single-bit pointer. The bit that represents the address of the single-bit pointer is referred to as the "address bit". The address bit is typically set to "1". According to an embodiment, the address bit is referred to as the single-bit pointer. In another embodiment, the bit-field that includes the address bit is referred to as the single-bit pointer.

According to an embodiment, the device controller 130a can convert the 5-bit write pointer 210 to a single-bit write pointer using the following verilog write pointer conversion algorithm:

```
always @ (wr_addr) begin case (wr_addr)
    5'b0_0000: write_position = 28'b1000_0000_0000_0000_0000_0000_0001;
    5'b0_0001: write_position = 28'b0000_0000_0000_0000_0000_0000_0010;
    5'b0_0010: write_position = 28'b0000_0000_0000_0000_0000_0000_0100;
    5'b0_0011: write_position = 28'b0000_0000_0000_0000_0000_0000_1000;
    5'b0_0100: write_position = 28'b0000_0000_0000_0000_0000_0001_0000;
    5'b0_0101: write_position = 28'b0000_0000_0000_0000_0000_0010_0000;
    5'b0_0110: write_position = 28'b0000_0000_0000_0000_0000_0100_0000;
    5'b0_0111: write_position = 28'b0000_0000_0000_0000_0000_1000_0000;
    5'b0_1000: write_position = 28'b0000_0000_0000_0000_0001_0000_0000;
    5'b0_1001: write_position = 28'b0000_0000_0000_0000_0010_0000_0000;
    5'b0_1010: write_position = 28'b0000_0000_0000_0000_0100_0000_0000;
    5'b0_1011: write_position = 28'b0000_0000_0000_0000_1000_0000_0000;
    5'b0_1100: write_position = 28'b0000_0000_0000_0001_0000_0000_0000;
    5'b0_1101: write_position = 28'b0000_0000_0000_0010_0000_0000_0000;
    5'b0_1110: write_position = 28'b0000_0000_0000_0100_0000_0000_0000;
    5'b0_1111: write_position = 28'b0000_0000_0000_1000_0000_0000_0000;
    5'b1_0000: write_position = 28'b0000_0000_0001_0000_0000_0000_0000;
    5'b1_0001: write_position = 28'b0000_0000_0010_0000_0000_0000_0000;
    5'b1_0010: write_position = 28'b0000_0000_0100_0000_0000_0000_0000;
    5'b1_0011: write_position = 28'b0000_0000_1000_0000_0000_0000_0000;
    5'b1_0100: write_position = 28'b0000_0001_0000_0000_0000_0000_0000;
    5'b1_0101: write_position = 28'b0000_0010_0000_0000_0000_0000_0000;
    5'b1_0110: write_position = 28'b0000_0100_0000_0000_0000_0000_0000;
    5'b1_0111: write_position = 28'b0000_1000_0000_0000_0000_0000_0000;
    5'b1_1000: write_position = 28'b0001_0000_0000_0000_0000_0000_0000;
    5'b1_1001: write_position = 28'b0010_0000_0000_0000_0000_0000_0000;
    5'b1_1010: write_position = 28'b0100_0000_0000_0000_0000_0000_0000;
    5'b1_1011: write_position = 28'b1000_0000_0000_0000_0000_0000_0001;
    default: write_position = 28'b0000_0000_0000_0000_0000_0000_0000;
endcase
end
```

With respect to the third condition, "rx_en_d1" can represent whether data is ready to be written to the register 140. For example, rx_en_d1 set to "1" can indicate that data is ready to be written to the register 140. In another example, rx_en_d1 set to "0" can indicate that data is not ready to be written to the register 140. Address increment and data filling generally stop in response to rx_en_d1 having a value of "0". For instance, the write address and/or read address generally is not incremented while rx_en_d1 is equal to "0". If none of the three exemplary conditions are satisfied, then the address of the write pointer 210 typically remains unchanged.

A multiple-bit pointer can be converted to a single-bit pointer using a combinational multiplexer (MUX), which can be implemented using software or hardware or a combination thereof. For example, verbose hardware description language (VHDL) can be used to implement the combnational MUX. In another example, the combinational MUX can be implemented using a software algorithm, such as an "always block" software algorithm. The software algorithm can be performed using any suitable coding language, such as verilog, C, C+, or assembly. According to an embodiment, an "always block" software algorithm assigns a "0" to all Referring to the write pointer conversion algorithm, the 5-bit address of the write pointer 210 can be represented using a single bit of a 28-bit field. For instance, the single bit can be located at one of the twenty-eight bit addresses of the 28-bit field. Generally, each 5-bit address of the register 140 is associated with a different bit of the 28-bit field. For example, the 5-bit address "5'b0_0000" can be associated with the first bit of the 28-bit field (i.e. 0000_0000_0000_0000_0000_0000_0001). The next successive address "5'b0_0001" can be associated with the second bit of the 28-bit field (i.e. 0000_0000_0000_0000_0000_0000_0010), and so on.

The address of the 5-bit pointer generally is represented using a binary notation. The address of the single-bit pointer typically is represented using a linear progression notation. For instance, when the binary address of the 5-bit pointer is incremented, the next higher significant bit of the 28-bit field becomes the address bit. The previous address bit is cleared (i.e. set to "0"), and the new address bit is set to "1". The address bit progresses linearly through the 28-bit field as the address of the 5-bit pointer is increased.

In an embodiment, the read pointer 220 is a 5-bit read pointer. The read pointer 220 can be generated based on positive clock edges, negative clock edges, or positive and negative clock edges. For instance, the second device 120 can generate the read pointer 220, based on positive and negative edges of the clock of the second device 120, using the following verilog read pointer generation algorithm:

```
always @ (posedge clk480 or negedge resetb_480)
    begin
        if (~resetb_480)
            rd_addr  <= 5'b0_0000;
        else if (rd_start || (rd_addr == 5'b1_1011))
            rd_addr  <= 5'b0_0000;
        else if (readok_sync2 || ~read_done)
            rd_addr  <= rc_addr + 1;
    end
```

The verilog read pointer generation algorithm shows three exemplary conditions, each of which can be satisfied to change the address of the read pointer 220. With respect to the first condition, "~resetb_480" can represent a reset bit. For example, if the reset bit is set to "1", then the read pointer 220 can be reset by setting the read address to "0". According to an embodiment, resetting the read pointer 220 causes the read pointer 220 to return to the first address of the register 140, regardless of the address of the read pointer 210 at the time the reset instruction is performed.

With respect to the second condition, if the read address reaches a value of twenty-seven, the address can be set to zero. For instance, after reaching the last address of the register 140, the read pointer 220 can continue reading at the first address of the register 140.

With respect to the third condition, "~read_done" can represent whether the read pointer 220 has finished reading an item of information from the register 140. For instance, ~read_done is generally set to "1" and can be set to "0" in response to the read pointer 220 successfully reading the item. "Readok_sync2" can represent whether the read pointer 220 is properly aligned to read the item from the register 140. For example, if the read address and the write address are the same, the read pointer 220 is typically not properly aligned to read an item from the register 140 that is written by the write pointer 210. Because the read pointer 220 and the write pointer 210 are not synchronized, the read pointer 220 can attempt to read the item before the write pointer 210 successfully writes the item.

In an embodiment, the host controller 130$b$ converts the 5-bit read pointer 220 to a single-bit read pointer using the following verilog read pointer conversion algorithm:

```
always @ (rd_addr)
    begin
        case (rd_addr)
            5'b0_0000: read_position = 28'b0000_0000_0000_0000_0000_0000_0001;
            5'b0_0001: read_position = 28'b0000_0000_0000_0000_0000_0000_0010;
            5'b0_0010: read_position = 28'b0000_0000_0000_0000_0000_0000_0100;
            5'b0_0011: read_position = 28'b0000_0000_0000_0000_0000_0000_1000;
            5'b0_0100: read_position = 28'b0000_0000_0000_0000_0000_0001_0000;
            5'b0_0101: read_position = 28'b0000_0000_0000_0000_0000_0010_0000;
            5'b0_0110: read_position = 28'b0000_0000_0000_0000_0000_0100_0000;
            5'b0_0111: read_position = 28'b0000_0000_0000_0000_0000_1000_0000;
            5'b0_1000: read_position = 28'b0000_0000_0000_0000_0001_0000_0000;
            5'b0_1001: read_position = 28'b0000_0000_0000_0000_0010_0000_0000;
            5'b0_1010: read_position = 28'b0000_0000_0000_0000_0100_0000_0000;
            5'b0_1011: read_position = 28'b0000_0000_0000_0000_1000_0000_0000;
            5'b0_1100: read_position = 28'b0000_0000_0000_0001_0000_0000_0000;
            5'b0_1101: read_position = 28'b0000_0000_0000_0010_0000_0000_0000;
            5'b0_1110: read_position = 28'b0000_0000_0000_0100_0000_0000_0000;
            5'b0_1111: read_position = 28'b0000_0000_0000_1000_0000_0000_0000;
            5'b1_0000: read_position = 28'b0000_0000_0001_0000_0000_0000_0000;
            5'b1_0001: read_position = 28'b0000_0000_0010_0000_0000_0000_0000;
            5'b1_0010: read_position = 28'b0000_0000_0100_0000_0000_0000_0000;
            5'b1_0011: read_position = 28'b0000_0000_1000_0000_0000_0000_0000;
            5'b1_0100: read_position = 28'b0000_0001_0000_0000_0000_0000_0000;
            5'b1_0101: read_position = 28'b0000_0010_0000_0000_0000_0000_0000;
            5'b1_0110: read_position = 28'b0000_0100_0000_0000_0000_0000_0000;
            5'b1_0111: read_position = 28'b0000_1000_0000_0000_0000_0000_0000;
            5'b1_1000: read_position = 28'b0001_0000_0000_0000_0000_0000_0000;
            5'b1_1001: read_position = 28'b0010_0000_0000_0000_0000_0000_0000;
            5'b1_1010: read_position = 28'b0100_0000_0000_0000_0000_0000_0000;
            5'b1_1011: read_position = 28'b1000_0000_0000_0000_0000_0000_0000;
            default: read_position = 28'b0000_0000_0000_0000_0000_0000_0000;
        endcase
    end
```

Referring to the read pointer conversion algorithm, the 5-bit address of the read pointer 220 can be represented using a single bit of a 28-bit field. For example, the 5-bit addresses of the register 140 can be associated with the bits of the 28-bit field as described above with respect to the write pointer conversion algorithm, though the scope of the invention is not limited in this respect. When the binary address of the 5-bit pointer is incremented, the next higher significant bit of the 28-bit field becomes the address bit. The previous address bit is cleared (i.e. set to "0"), and the new address bit is set to "1". The address bit progresses linearly through the 28-bit field as the address of the 5-bit pointer is increased.

The verilog algorithms are provided for illustrative purposes, and are not intended to limit the scope of the present invention. For example, the pointers 210 and 220 need not be represented using a binary notation, as shown in the write pointer conversion algorithm and the read pointer conversion algorithm. The pointers 210 and 220 can be represented using another notation, such as gray code, decimal, or hexadecimal. For instance, executing an algorithm using gray code can provide less noise than executing an algorithm in which multiple bits of the 28-bit write field or the 28-bit read field can change in response to the associated clock being incremented. A gray code representation of a pointer 210 or 220 is generally manipulated to provide a pointer 210 or 220 that is capable of being incremented linearly.

The first device 110 or the second device 120 can compare the single-bit write pointer 210 and the single-bit read pointer 220. Persons skilled in the art will recognize that any suitable hardware and/or software means can be used to compare the single-bit pointers 210 and 220. For example, the hardware means can include digital logic components, such as AND, OR, XOR, NAND, and/or NOR gates. The software means can include verilog, C, C+, and/or assembly code.

Comparing the addresses of the pointers 210 and 220 can indicate whether the single-bit read pointer 220 is properly aligned to read information written by the single-bit write pointer 210. The comparison can indicate whether the single-bit read pointer 220 is likely to read from a memory location 250 of the register 140 before the single-bit write pointer 210 finishes writing information to that memory location 250. The comparison can indicate whether the single-bit write pointer 210 is likely to write to a memory location 250 of the register 140 before the single-bit read pointer 220 reads information previously written to the memory location 250 by the write pointer 210.

The comparison can be performed using a bit-wise comparison technique. For instance, each bit of the 28-bit field associated with the write pointer 210, referred to as the "write field", and the corresponding bit of the 28-bit field associated with the read pointer 220, referred to as the "read field", can be compared.

According to an embodiment, the single-bit write pointer 210 and the single-bit read pointer 220 can be compared using the following verilog comparison algorithm:

Register_error=(write_position & read_position);

The comparison algorithm compares each bit of the write field with the corresponding bit of the read field using a logical "AND" operation. The logical AND operation is a bitwise AND operation. For instance, the bitwise AND operation can include twenty-eight AND operations, one for each set of corresponding bits of the 28-bit write and read fields.

"Register_error" can be a 28-bit field that includes the results of the twenty-eight bitwise AND operations performed using the 28-bit write and read fields. For example, the least significant bit of the register_error field can store the result of the AND operation that compares the least significant bit of each of the write and read fields. The next significant bit of the register-error field can store the result of the AND operation that compares the next significant bit of each of the write and read fields, and so on.

The twenty-eight bits of the register_error field can be compared to provide a single error bit that indicates whether the single-bit read pointer 220 is properly aligned to read information written by the single-bit write pointer 210. The bits of the register_error field are generally compared using a logical "OR" operation. For instance, if any bit of the register_error field is a "1", then the error bit is a "1".

A single error bit equal to "1" generally indicates that an error has likely occurred (or is likely to occur) during a read operation performed by the single-bit read pointer 220. For instance, the single error bit having a value of "1" can indicate that the address bit of the single-bit read pointer 220 is the same as the address bit of the single-bit write pointer 210.

According to an embodiment of the present invention, the 28-bit write field and/or the 28-bit read field can include one or more "guard bits". A guard bit is typically a bit of the write field or the read field, other than an address bit, that has a value of "1". Guard bit(s) are generally adjacent to the address bit of the field, though a guard bit can be located at any suitable bit address of the field. For example, at least one guard bit can be located on each side of an address bit. Guard bits need not be located symmetrically on both sides of the address bit. In another example, guard bit(s) are located on only one side of the address bit.

Following is an exemplary verilog write pointer conversion algorithm in which one guard bit is used on each side of the address bit:

```
always @ (wr_addr) begin case (wr_addr)
    5'b0_0000: write_position = 28'b1000_0000_0000_0000_0000_0000_0011;
    5'b0_0001: write_position = 28'b0000_0000_0000_0000_0000_0000_0111;
    5'b0_0010: write_position = 28'b0000_0000_0000_0000_0000_0000_1110;
    5'b0_0011: write_position = 28'b0000_0000_0000_0000_0000_0001_1100;
    5'b0_0100: write_position = 28'b0000_0000_0000_0000_0000_0011_1000;
    5'b0_0101: write_position = 28'b0000_0000_0000_0000_0000_0111_0000;
    5'b0_0110: write_position = 28'b0000_0000_0000_0000_0000_1110_0000;
    5'b0_0111: write_position = 28'b0000_0000_0000_0000_0001_1100_0000;
    5'b0_1000: write_position = 28'b0000_0000_0000_0000_0011_1000_0000;
    5'b0_1001: write_position = 28'b0000_0000_0000_0000_0111_0000_0000;
    5'b0_1010: write_position = 28'b0000_0000_0000_0000_1110_0000_0000;
    5'b0_1011: write_position = 28'b0000_0000_0000_0001_1100_0000_0000;
    5'b0_1100: write_position = 28'b0000_0000_0000_0011_1000_0000_0000;
    5'b0_1101: write_position = 28'b0000_0000_0000_0111_0000_0000_0000;
    5'b0_1110: write_position = 28'b0000_0000_0000_1110_0000_0000_0000;
    5'b0_1111: write_position = 28'b0000_0000_0001_1100_0000_0000_0000;
    5'b1_0000: write_position = 28'b0000_0000_0011_1000_0000_0000_0000;
    5'b1_0001: write_position = 28'b0000_0000_0111_0000_0000_0000_0000;
    5'b1_0010: write_position = 28'b0000_0000_1110_0000_0000_0000_0000;
    5'b1_0011: write_position = 28'b0000_0001_1100_0000_0000_0000_0000;
```

-continued

```
5'b1_0100: write_position = 28'b0000_0011_1000_0000_0000_0000_0000;
5'b1_0101: write_position = 28'b0000_0111_0000_0000_0000_0000_0000;
5'b1_0110: write_position = 28'b0000_1110_0000_0000_0000_0000_0000;
5'b1_0111: write_position = 28'b0001_1100_0000_0000_0000_0000_0000;
5'b1_1000: write_position = 28'b0011_1000_0000_0000_0000_0000_0000;
5'b1_1001: write_position = 28'b0111_0000_0000_0000_0000_0000_0000;
5'b1_1010: write_position = 28'b1110_0000_0000_0000_0000_0000_0000;
5'b1_1011: write_position = 28'b1100_0000_0000_0000_0000_0000_0001;
default: write_position = 28'b0000_0000_0000_0000_0000_0000_0000;
endcase
end
```

Referring to the write pointer conversion algorithm in which one guard bit is used on each side of the address bit, the 5-bit address "5'b0_0000" of the write pointer 210 is associated with the first bit of the 28-bit write field. For instance, the first bit of the 28-bit field is the write address, and the second and twenty-eighth bits of the 28-bit field are guard bits. The address bit and the guard bits generally progress linearly through the 28-bit field as the 5-bit address is incremented. For example, the next successive address "5'b0_0001" is associated with the second bit of the 28-bit write field. In this example, the second bit of the 28-bit field is the address bit, and the first and third bits of the 28-bit field are guard bits.

A guard bit can protect against an overflow condition or an underflow condition. An overflow condition occurs when the single-bit write pointer 210 writes to a memory location 250 of the register 140 before the single-bit read pointer 220 reads information previously written by the single-bit write pointer 210 to that memory location 250. For example, the clock associated with the single-bit write pointer 210 can have a frequency that is greater than the frequency of the clock associated with the single-bit read pointer 220. In this example, the single-bit write pointer 210 can write information more quickly than the single-bit read pointer 220 can read the information.

An underflow condition occurs when the single-bit read pointer 220 reads from a memory location 250 of the register 140 before the single-bit write pointer 210 writes to the memory location 250. For instance, the single-bit read pointer 220 can read at a frequency that is greater than the frequency at which the single-bit write pointer 210 writes to the register 140.

If the 28-bit write field does not include a guard bit, a read error generally is not detected until the single-bit read pointer 220 collides with the single-bit write pointer 210. For instance, the read error can be detected in response to the read address and the write address being the same. The information read by the single-bit read pointer 220 can be different from the information written by the single-bit write pointer 210. However, if the 28-bit write field includes a guard bit, the single-bit read pointer 220 can encounter the address of the guard bit, rather than the address of the single-bit write pointer 210. For instance, a read error can be detected, though the single-bit write pointer 210 and the single-bit read pointer 220 have not collided.

According to an embodiment, the read error can be detected using the comparison algorithm as described above. The bits of the register_error field can be generated by comparing the 28-bit write field and the 28-bit read field. For instance, the 28-bit read and write fields can be compared using twenty-eight bitwise AND operations. For illustrative purposes, the 28-bit read field can be 28'b0000_0000_0000_0000_0000_0100_0000, and the 28-bit write field can be 28'b0000_0000_0000_0000_0001_1100_0000. Comparing these fields using bitwise AND operations provides a 28-bit register_error field of 28'b0000_0000_0000_0000_0000_0100_0000. A single error bit can be generated by comparing the bits of the register_error field using a logical OR operation. In this example, using a logical OR operation to compare the bits of the register_error field provides a single error bit of "1". The first device 110 or the second device 120 detects a read error in response to the read address and the address of the guard bit being the same.

The single-bit write pointer 210 and/or the single-bit read pointer 220 can drift in either direction of the register 140 as time goes by. For instance, the single-bit read pointer 220 can collide with the single-bit write pointer 210 or a guard bit thereof from either direction. Having at least one guard bit on either side of the address bit of the write field can increase the likelihood that an error will be detected before an actual error occurs.

A meta-stable condition can occur if the single-bit write pointer 210 or the single-bit read pointer 220 is in transition when the single-bit pointers 210 and 220 are compared. For example, if the read bit is changing from the fourth bit of the 28-bit read field to the fifth bit of the 28-bit read field, the fourth and/or fifth bits of the 28-bit read field can have a value that is unknown to the device controller 130a or the host controller 130b. For example, at the time of the comparison, the fourth bit can be transitioning from a "1" to a "0", and the fifth bit can be transitioning from a "0" to a "1". Assuming a read error occurs, the device controller 130a or the host controller 130b can fail to detect the read error.

Having one or more guard bits adjacent to the read bit can increase the likelihood of successfully detecting the read error. The combination of the read bit and the guard bit(s) can be referred to as a read block. If the single-bit write pointer 210 and the single-bit read pointer 220 are progressing toward each other, for example, the read block provides multiple opportunities for the device controller 130a or the host controller 130b to detect the read error. For instance, the controller 130 can compare the first bit of the read block and the corresponding bit of the 28-bit write field. If the controller 130 fails to detect a read error, the next consecutive bit of the read block and the corresponding bit of the 28-bit write field can be compared at the next consecutive clock cycle. The controller 130 can again attempt to detect the read error. The number of opportunities the controller 130 has to re-attempt the read error detection is generally equal to the number of guard bits included in the 28-bit read field.

Figure 3:
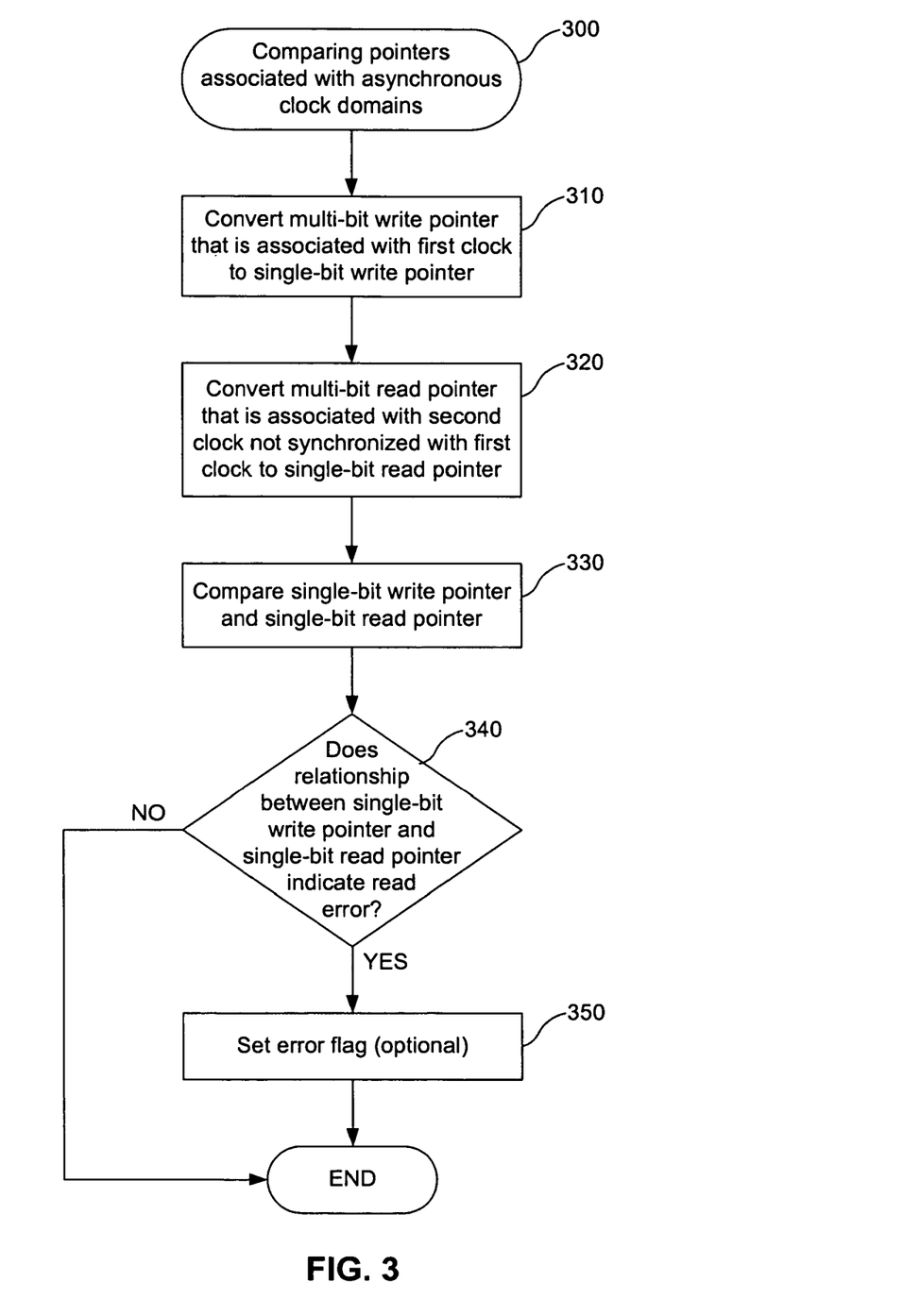
FIG. 3 illustrates a flowchart of a first method of comparing pointers associated with asynchronous clock domains according to an embodiment of the present invention.
Figure 4:
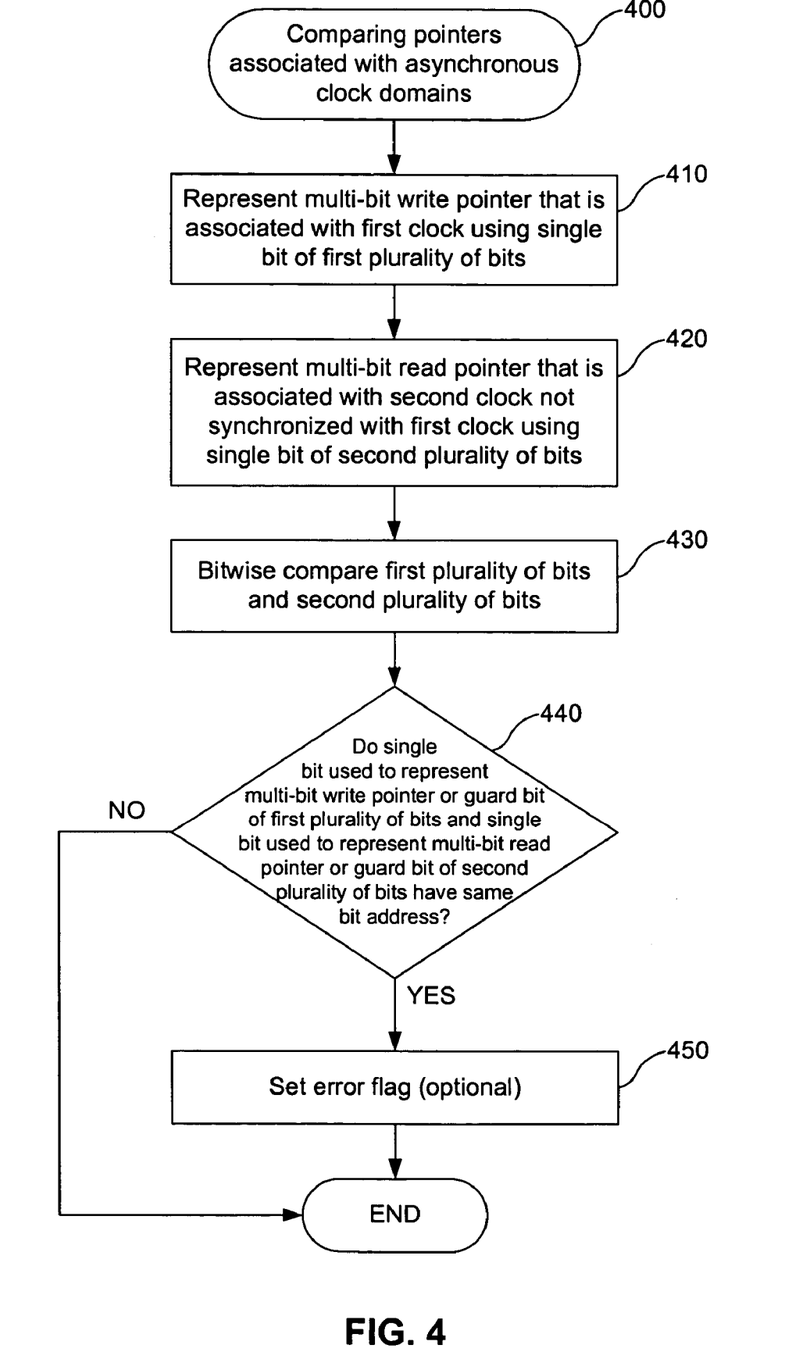
FIG. 4 illustrates a flowchart of a second method of comparing pointers associated with asynchronous clock domains according to an embodiment of the present invention.

FIGS. 3 and 4 illustrate flow charts of methods of comparing pointers associated with asynchronous clock domains according to embodiments of the present invention. The invention, however, is not limited to the descriptions provided by the flowcharts 300 and 400. Rather, it will be apparent to persons skilled in the relevant art(s) from the teachings provided herein that other functional flows are within the scope and spirit of the present invention.

Flowcharts 300 and 400 will be described with continued reference to the example system 100 described above in reference to FIG. 1. The invention is not, however, limited to that embodiment.

Referring to FIG. 3, a controller 130 converts at block 310 a multi-bit write pointer that is associated with a first clock to a single-bit write pointer. For instance, the write pointer can be associated with the first device 110. The controller 130 converts at block 320 a multi-bit read pointer that is associated with a second clock to a single-bit read pointer. For example, the second clock can be associated with the second device 120. The first clock and the second clock are not synchronized with each other, though the clocks can have the same frequency. The controller 130 that converts the multi-bit write pointer and the controller 130 that converts the multi-bit read pointer need not necessarily be the same controller 130. For instance, one of the controllers 130 can be the device controller 130a, and the other controller 130 can be the host controller 130b.

The controller 130 can compare at block 330 the single-bit write pointer and the single-bit read pointer. For example, the controller 130 can compare an address of the single-bit write pointer and an address of the single-bit read pointer. If a relationship between the single-bit write pointer and the single-bit read pointer indicates a read error, as can be determined at diamond 340, then the controller 130 can set the error flag at block 350. Otherwise, the error flag generally is not set.

The relationship between the single-bit write pointer and the single-bit read pointer is typically based on the value and/or bit address of one or more bits associated with the single-bit pointers. For example, the single bit that represents each pointer typically has a value of "1". Any guard bits associated with the single-bit pointers usually have a value of "1".

According to an embodiment, a controller 130 can indicate a read error in response to the write pointer or a guard bit associated therewith and the read pointer or a guard bit associated therewith having the same bit address. For example, the address of the single-bit write pointer and the address of the single-bit read pointer can be the same. In another example, a guard bit associated with the single-bit write pointer can have the same address as a guard bit associated with the single-bit read pointer. In yet another example, a guard bit associated with one of the single-bit pointers can have the same address as the other pointer.

Referring to FIG. 4, a controller 130 represents at block 410 a multi-bit write pointer that is associated with a first clock using a single bit of a first plurality of bits. The controller 130 represents at block 420 a multi-bit read pointer that is associated with a second clock using a single bit of a second plurality of bits. The first clock and the second clock are not synchronized with each other. The controller 130 that represents the multi-bit write pointer and the controller 130 that represents the multi-bit read pointer need not necessarily be the same controller 130.

Each bit of the first plurality of bits and the second plurality of bits has a bit address. The bit address of a particular bit indicates the relative location of that bit in the plurality of bits, with respect to other bits of the plurality of bits. A bit of the first plurality of bits and a bit of the second plurality of bits generally have the same address when the relative location of the bit of the first plurality of bits corresponds with the relative location of the bit of the second plurality of bits.

The controller 130 bitwise compares the first plurality of bits and the second plurality of bits. The first plurality of bits and/or the second plurality of bits can include one or more guard bits. If the single bit used to represent the multi-bit write pointer or a guard bit of the first plurality of bits has the same bit address as the single bit used to represent the multi-bit read pointer or a guard bit of the second plurality of bits, as can be determined at diamond 440, then the controller 130 can indicate at block 450 a read error. Otherwise, a read error generally is not indicated.

CONCLUSION

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above described exemplary embodiments, but should be defined only in accordance with the following claims and their equivalents.

What is claimed is:

1. A method, comprising:
converting a multi-bit write pointer that is associated with a first clock to a single-bit write pointer represented by a first plurality of bits, each bit of the first plurality of bits corresponding to a respective address, wherein converting the multi-bit write pointer includes setting a bit of the first plurality of bits that corresponds to an address specified by the multi-bit write pointer;
converting a multi-bit read pointer that is associated with a second clock not synchronized with the first clock to a single-bit read pointer represented by a second plurality of bits, each bit of the second plurality of bits corresponding to a respective address, wherein converting the multi-bit read pointer includes setting a bit of the second plurality of bits that corresponds to an address specified by the multi-bit read pointer; and
comparing the single-bit write pointer and the single-bit read pointer to determine whether a read error occurs.

2. The method of claim 1, wherein comparing the single-bit write pointer and the single-bit read pointer includes comparing the single-bit write pointer and the single-bit read pointer using a bitwise logical AND operation.

3. The method of claim 1, wherein comparing the single-bit write pointer and the single-bit read pointer includes comparing the single-bit write pointer and the single-bit read pointer using a bitwise logical AND operation to provide a plurality of bits, and the method further comprises comparing the plurality of bits using a logical OR operation.

4. The method of claim 1, wherein at least one of the first plurality of bits and the second plurality of bits includes a guard bit.

5. The method of claim 1, wherein comparing the single-bit write pointer and the single-bit read pointer includes comparing a write address of the single-bit write pointer and a read address of the single-bit read pointer.

6. The method of claim 5, wherein converting the multi-bit write pointer includes converting the multi-bit write pointer having an address that is represented using a binary notation to the single-bit write pointer having the write address that is represented using a linear progression notation.

7. The method of claim 5, wherein converting the multi-bit read pointer includes converting the multi-bit read pointer having an address that is represented using a binary notation to the single-bit read pointer having the read address that is represented using a linear progression notation.

8. A method, comprising:
representing a multi-bit write pointer that is associated with a first clock using a single bit of a first plurality of bits, each bit of the first plurality of bits being relevant to representing the multi-bit write pointer;
representing a multi-bit read pointer that is associated with a second clock not synchronized with the first clock using a single bit of a second plurality of bits, each bit of the second plurality of bits being relevant to representing the multi-bit read pointer; and
bitwise comparing the first plurality of bits and the second plurality of bits to determine whether a read error occurs.

9. The method of claim 8, wherein bitwise comparing the first plurality of bits and the second plurality of bits includes bitwise comparing the first plurality of bits and the second plurality of bits using a logical AND operation.

10. The method of claim 8, wherein bitwise comparing the first plurality of bits and the second plurality of bits includes bitwise comparing the first plurality of bits and the second plurality of bits using a logical AND operation to provide a third plurality of bits.

11. The method of claim 10, further comprising individually comparing the third plurality of bits using a logical OR operation.

12. The method of claim 8, wherein at least one of the first plurality of bits and the second plurality of bits includes a guard bit.

13. The method of claim 8, further comprising determining that a read error occurs, based on the single bit of the first plurality of bits or a guard bit of the first plurality of bits having a bit address that is the same as a bit address of the single bit of the second plurality of bits or a guard bit of the second plurality of bits.

14. An apparatus, comprising:
means for converting a multi-bit write pointer that is associated with a first clock to a single-bit write pointer represented by a first plurality of bits. each bit of the first plurality of bits corresponding to a respective address, wherein converting the multi-bit write pointer includes setting a bit of the first plurality of bits that corresponds to an address specified by the multi-bit write pointer
means for converting a multi-bit read pointer that is associated with a second clock not synchronized with the first clock to a single-bit read pointer represented by a second plurality of bits, each bit of the second plurality of bits corresponding to a respective address, wherein converting the multi-bit read pointer includes setting a bit of the second plurality of bits that corresponds to an address specified by the multi-bit read pointer; and
means for comparing the single-bit write pointer and the single-bit read pointer to determine whether a read error occurs.

15. The apparatus of claim 14, wherein the means for comparing the single-bit write pointer and the single-bit read pointer compare the single-bit write pointer and the single-bit read pointer using a bitwise logical AND operation.

16. The apparatus of claim 14, wherein the means for comparing the single-bit write pointer and the single-bit read pointer compare the single-bit write pointer and the single-bit read pointer using a bitwise logical AND operation to provide a plurality of bits, and the apparatus further comprises means for comparing the plurality of bits using a logical OR operation.

17. The apparatus of claim 14, wherein at least one of the first plurality of bits and the second plurality of bits includes a guard bit.

18. The apparatus of claim 14, wherein the means for comparing the single-bit write pointer and the single-bit read pointer compare a write address of the single-bit write pointer and a read address of the single-bit read pointer.

19. The apparatus of claim 18, wherein the means for converting the multi-bit write pointer convert the multi-bit write pointer having an address that is represented using a binary notation to the single-bit write pointer having the write address that is represented using a linear progression notation.

20. The apparatus of claim 18, wherein the means for converting the multi-bit read pointer convert the multi-bit read pointer having an address that is represented using a binary notation to the single-bit read pointer having the read address that is represented using a linear progression notation.

21. An apparatus, comprising:
means for representing a multi-bit write pointer that is associated with a first clock using a single bit of a first plurality of bits, each bit of the first plurality of bits being relevant to representing the multi-bit write pointer;
means for representing a multi-bit read pointer that is associated with a second clock not synchronized with the first clock using a single bit of a second plurality of bits, each bit of the second plurality of bits being relevant to representing the multi-bit read pointer; and
means for bitwise comparing the first plurality of bits and the second plurality of bits to determine whether a read error occurs.

22. The apparatus of claim 21, wherein the means for bitwise comparing the first plurality of bits and the second plurality of bits bitwise compare the first plurality of bits and the second plurality of bits using a logical AND operation.

23. The apparatus of claim 21, wherein the means for bitwise comparing the first plurality of bits and the second plurality of bits bitwise compare the first plurality of bits and the second plurality of bits using a logical AND operation to provide a third plurality of bits, and the apparatus further comprises means for comparing the third plurality of bits using a logical OR operation.

24. The apparatus of claim 21, wherein at least one of the first plurality of bits and the second plurality of bits includes a guard bit.

25. The apparatus of claim 21, further comprising means for determining that a read error occurs, based on the single bit of the first plurality of bits or a guard bit of the first plurality of bits having a bit address that is the same as a bit address of the single bit of the second plurality of bits or a guard bit of the second plurality of bits.

* * * * *